United States Patent
Kobayashi (10) Patent No.: US 7,450,836 B2
(45) Date of Patent: Nov. 11, 2008

(54) IMAGE DEVICE, CONTROL METHOD FOR THE IMAGING DEVICE, PROGRAM FOR PERFORMING THE CONTROL METHOD, AND RECORDING MEDIUM RECORDING THE PROGRAM

(75) Inventor: Fumikazu Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 11/294,068

(22) Filed: Dec. 5, 2005

(65) Prior Publication Data
US 2006/0120709 A1 Jun. 8, 2006

(30) Foreign Application Priority Data
Dec. 6, 2004 (JP) ............... P2004-352170

(51) Int. Cl.
G03B 3/00 (2006.01)
G03B 13/36 (2006.01)
(52) U.S. Cl. ............... 396/72; 396/80; 348/353
(58) Field of Classification Search ............ 396/80, 396/81, 82, 72, 77, 79, 85, 89; 348/345, 348/349, 353–355
See application file for complete search history.

(56) References Cited

U.S. PATENT DOCUMENTS

2005/0046966 A1 * 3/2005 Okawara ............ 359/696

FOREIGN PATENT DOCUMENTS

| JP | 3 220876 | 9/1991 |
|---|---|---|
| JP | 5 45575 | 2/1993 |
| JP | 5 119249 | 5/1993 |
| JP | 9 33792 | 2/1997 |
| JP | 2001 208954 | 8/2001 |
| JP | 2003 101853 | 4/2003 |

* cited by examiner

*Primary Examiner*—W. B. Perkey
*Assistant Examiner*—Rishi S Suthar
(74) *Attorney, Agent, or Firm*—Frommer Lawrence & Haug LLP; William S. Frommer; Ellen Marcie Emas (57) ABSTRACT

Disclosed herein is an imaging device having a lens including a zoom lens and a focus lens; an image sensor for outputting an imaging result of an optical image formed by the lens; a signal processor for processing the imaging result to output a video signal; a detector for processing the video signal to output an evaluation value indicative of the degree of focusing; a memory for storing data of an imaging range where a focused image is ensured, by using a cam curve of the lens; and a controller for moving the focus lens in concert with the zoom lens; wherein when a focal depth detected according to a current position of the zoom lens is less than the imaging range at the current position of the zoom lens, the controller performs autofocus control using the evaluation value to move the focus lens; and when the focal depth is greater than the imaging range at the current position of the zoom lens, the controller performs focus control by the cam curve to move the focus lens. Thus, the autofocus control and the focus control by the cam curve are switched to each other according to the result of comparison between the focal depth and the imaging range at the current position of the zoom lens.

5 Claims, 6 Drawing Sheets

FIG. 6

IMAGE DEVICE, CONTROL METHOD FOR THE IMAGING DEVICE, PROGRAM FOR PERFORMING THE CONTROL METHOD, AND RECORDING MEDIUM RECORDING THE PROGRAM

CROSS REFERENCES TO RELATED APPLICATIONS

The present invention contains subject matter related to Japanese Patent Application JP 2004-352170 filed in the Japanese Patent Office on Dec. 6, 2004, the entire of which being incorporated herein by reference.

BACKGROUND OF THE INVENTION

The present invention relates to an imaging device, a control method for the imaging device, a program for performing the control method, and a recording medium recording the program, and is applicable to a monitoring device, for example. The imaging device according to the present invention includes a controller for comparing a focal depth detected according to a current position of a zoom lens and an imaging range where a focused image is ensured at the current position of the zoom lens and for switching between autofocus control using an evaluation value and focus control by a cam curve according to the result of this comparison, so that the reliability of a focus adjusting mechanism can be greatly improved over the related art in an imaging device using an inner focus type lens or the like.

An imaging device in related art such as a video camera has a function of autofocus control. As disclosed in Japanese Patent Laid-open No. Hei 3-220876, for example, the autofocus control is such that a high-frequency signal component is extracted from an imaging result and is integrated to thereby calculate an evaluation value indicative of the degree of focusing and that a focus lens is moved by a so-called hill-climbing method using this evaluation value to thereby form a focusing condition.

Such an imaging device employs an inner focus type lens to realize a compact size. In the inner focus type lens, the focus lens must be maintained at a proper position relative to the zoom lens according to a subject distance from the lens to a subject in performing zoom-in and zoom-out operations. Accordingly, in such an inner focus type imaging device, the focus lens is maintained at a proper position relative to the zoom lens in combination with the autofocus control, thereby allowing the imaging of a desired subject with magnification.

There is a case that this kind of imaging device is used for a monitoring device. In this case, the imaging device is used continuously for a long period of time, and zoom-in and zoom-out operations are performed by remote control as required.

If the autofocus control by a hill-climbing method is performed in such a case, a focus adjusting mechanism is operated continuously for a long period of time, causing an excessive load on the focus adjusting mechanism. As a result, the reliability of the focus adjusting mechanism is rapidly reduced.

SUMMARY OF THE INVENTION

It is desirable to provide an imaging device using an inner focus type lens which can greatly improve the reliability of the focus adjusting mechanism over the related art.

It is desirable to provide a control method for the imaging device.

It is desirable to provide a program for performing the control method.

It is a still desirable to provide a recording medium recording the program.

In accordance with an embodiment of the present invention, there is provided an imaging device comprising a lens including a zoom lens and a focus lens; an image sensor for outputting an imaging result of an optical image formed by the lens; signal processing means for processing the imaging result to output a video signal; detecting means for processing the video signal to output an evaluation value indicative of the degree of focusing; a memory for storing data of an imaging range where a focused image is ensured, by using a cam curve of the lens; and control means for moving the focus lens in concert with the zoom lens; wherein when a focal depth detected according to a current position of the zoom lens is less than the imaging range at the current position of the zoom lens, the control means performs autofocus control using the evaluation value to move the focus lens; and when the focal depth is greater than the imaging range at the current position of the zoom lens, the control means performs focus control by the cam curve to move the focus lens.

In accordance with an embodiment of the present invention, there is provided a control method for an imaging device comprising a lens including a zoom lens and a focus lens; an image sensor for outputting an imaging result of an optical image formed by the lens; signal processing means for processing the imaging result to output a video signal; a memory for storing data of an imaging range where a focused image is ensured, by using a cam curve of the lens; and control means for moving the focus lens in concert with the zoom lens; the control method comprising the steps of calculating a focal depth according to a current position of the zoom lens; comparing the focal depth calculated by the calculating step and the imaging range at the current position of the zoom lens; performing autofocus control using an evaluation value indicative of the degree of focusing of the imaging result to move the focus lens when the focal depth is less than the imaging range according to the result of comparison by the comparing step; and performing focus control by the cam curve to move the focus lens when the focal depth is greater than the imaging range according to the result of comparison by the comparing step.

In accordance with an embodiment of the present invention, there is provided a control program for making control means provided in an imaging device execute predetermined processing; the imaging device comprising a lens including a zoom lens and a focus lens; an image sensor for outputting an imaging result of an optical image formed by the lens; signal processing means for processing the imaging result to output a video signal; a memory for storing data of an imaging range where a focused image is ensured, by using a cam curve of the lens; and the control means for moving the focus lens in concert with the zoom lens; the predetermined processing comprising the steps of calculating a focal depth according to a current position of the zoom lens; comparing the focal depth calculated by the calculating step and the imaging range at the current position of the zoom lens; performing autofocus control using an evaluation value indicative of the degree of focusing of the imaging result to move the focus lens when the focal depth is less than the imaging range according to the result of comparison by the comparing step; and performing focus control by the cam curve to move the focus lens when the focal depth is greater than the imaging range according to the result of comparison by the comparing step.

In accordance with an embodiment of the present invention, there is provided a recording medium recording a control program for making control means provided in an imaging device execute predetermined processing; the imaging device comprising a lens including a zoom lens and a focus lens; an image sensor for outputting an imaging result of an optical image formed by the lens; signal processing means for processing the imaging result to output a video signal; a memory for storing data of an imaging range where a focused image is ensured, by using a cam curve of the lens; and the control means for moving the focus lens in concert with the zoom lens; the predetermined processing comprising the steps of calculating a focal depth according to a current position of the zoom lens; comparing the focal depth calculated by the calculating step and the imaging range at the current position of the zoom lens; performing autofocus control using an evaluation value indicative of the degree of focusing of the imaging result to move the focus lens when the focal depth is less than the imaging range according to the result of comparison by the comparing step; and performing focus control by the cam curve to move the focus lens when the focal depth is greater than the imaging range according to the result of comparison by the comparing step.

According to the embodiment of the present invention, the autofocus control using the evaluation value is performed to move the focus lens when the focal depth is less than the imaging range at the current position of the zoom lens, whereas the focus control by the cam curve is performed to move the focus lens when the focal depth is greater than the imaging range at the current position of the zoom lens. Accordingly, the time period for the autofocus control can be shortened by an amount corresponding to the focus control by the cam curve, so that the reliability of the focus adjusting mechanism can be greatly improved over the related art. Further, since the focus control by the cam curve is performed when the focal depth is greater than the imaging range at the current position of the zoom lens, blurring can be prevented in the required imaging range to thereby effect the focus control sufficiently in a practical use.

According to the embodiment of the present invention, it is possible to provide a control method for an imaging device using an inner focus type lens, a program for performing the control method, and a recording medium recording the program, wherein the reliability of the focus adjusting mechanism can be greatly improved over the related art.

DETAILED DESCRIPTION OF THE PREFERRED EMBODIMENTS

A preferred embodiment of the present invention will now be described in detail with reference to the drawings.

Figure 2:
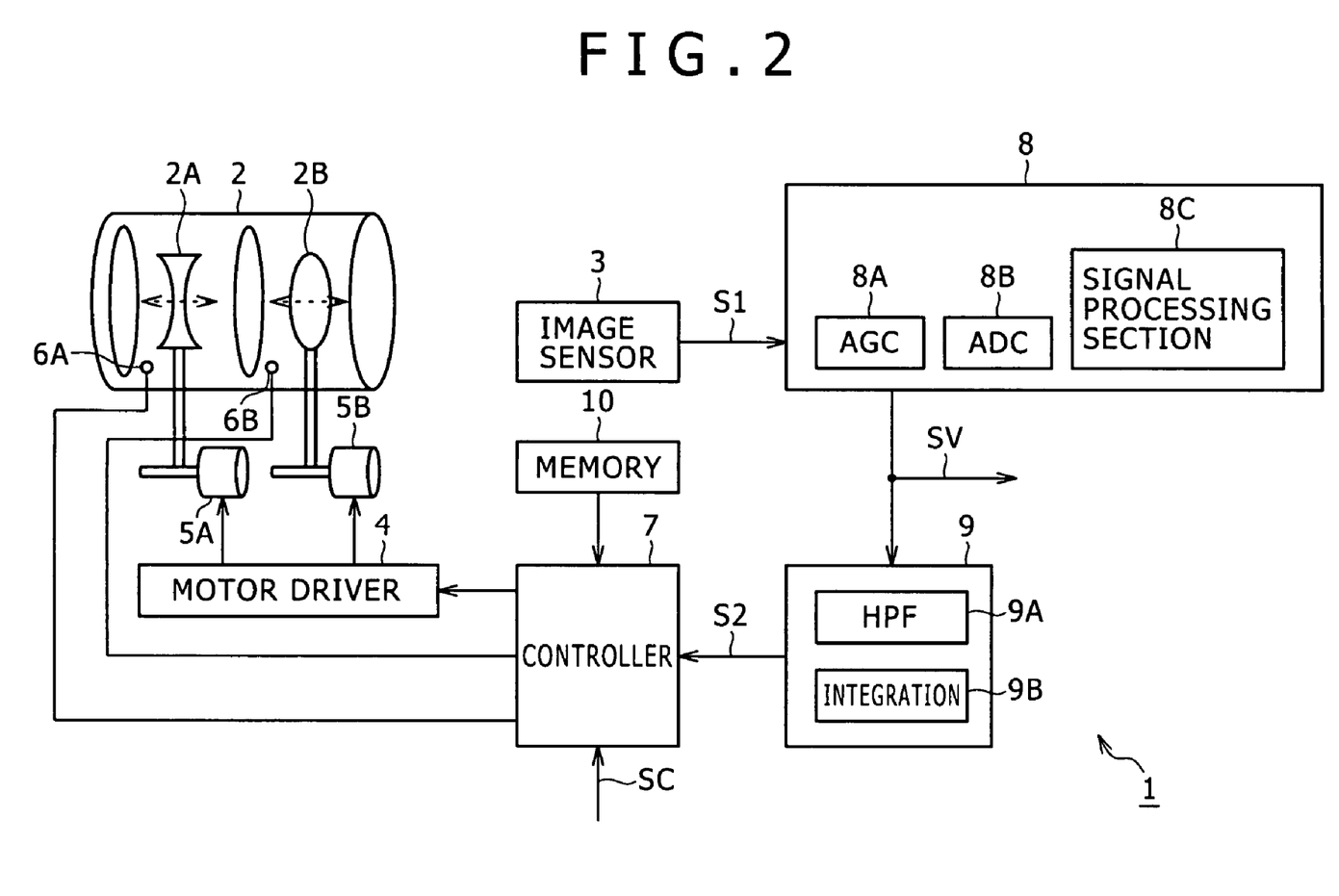
FIG. 2 is a block diagram showing the imaging device.

FIG. 2 is a block diagram showing an imaging device 1 according to a preferred embodiment of the present invention. The imaging device 1 constitutes a monitoring device, wherein a remote control signal SC is input from a remote control device (not shown) in response to an operation by an operator, and a lens 2 is driven in response to this remote control signal SC to obtain an imaging result, according to which a video signal SV is output.

The lens 2 in this imaging device 1 focuses incident light on an imaging surface of an image sensor 3 located on the downstream side of the lens 2. The lens 2 is an inner focus type zoom lens including a zoom lens 2A and a focus lens 2B provided on one side of the zoom lens 2A so as to face the image sensor 3. The zoom lens 2A and the focus lens 2B are held so as to be movable along the optical axis of the lens 2 by motors 5A and 5B, respectively. The motors 5A and 5B are driven by a motor driver 4, which is controlled by a controller 7. The position of the zoom lens 2A and the position of the focus lens 2B are detected by position sensors 6A and 6B, respectively, and the results of detection by the position sensors 6A and 6B are sent to the controller 7. Accordingly, the magnification of the lens 2 and the subject distance from a subject to the lens 2 can be varied by the controller 7. Further, a stop (not shown) in the lens 2 can also be varied by the controller 7.

The image sensor 3 is configured by a CCD (Charge Coupled Device) solid-state image sensor, for example, and outputs an image signal S1 according to the imaging result from the lens 2.

A signal processing circuit 8 is provided to process the image signal S1 output from the image sensor 3 and to output the video signal SV. The signal processing circuit 8 includes an AGC circuit 8A, an analog-digital converting (ADC) circuit 8B located on the downstream side of the AGC circuit 8A, and a signal processing section 8C located on the downstream side of the analog-digital converting circuit 8B. The AGC circuit 8A corrects the signal level of the image signal S1 to output the image signal thus corrected in level. The analog-digital converting circuit 8B performs analog-digital conversion processing of the image signal output from the AGC circuit 8A to thereby generate image data. The signal processing section 8C performs knee processing, gamma correction processing, white balance control processing, etc. of the image data output from the analog-digital converting circuit 8B to thereby generate the video signal SV. Accordingly, a desired subject is imaged by the imaging device 1 under the shooting conditions set by driving the lens 2 controlled by the controller 7, thus outputting the video signal SV.

A detecting circuit 9 is provided to process the video signal SV and to output an evaluation value S2 indicative of the degree of focusing. The detecting circuit 9 includes a high-pass filter (HPF) circuit 9A for extracting a signal component having frequencies higher than the frequency of the video signal SV and an integrating circuit 9B for integrating the output signal from the high-pass filter circuit 9A to output the evaluation value S2.

The controller 7 is a microcomputer for controlling the operation of the imaging device 1. More specifically, a control program stored in a memory (not shown) is executed to thereby control the stop of the lens 2 according to a luminance level of the video signal SV output from the signal processing circuit 8 and to also drive the lens 2 according to the remote control signal SC input from the remote control device. In this series of processing, the controller 7 moves the focus lens 2B according to the autofocus control by a hill-climbing method using the evaluation value S2 output from the detecting circuit 9 or according to a cam curve. Cam curve data specifying the cam curve as shown by the characteristic curves in FIG. 3 for driving the lens 2 is stored in a memory 10.

In this preferred embodiment, the control program for use in the processing to be executed by the controller 7 is preliminarily installed in the imaging device 1. As a modification, the control program may be provided by downloading through a network such as the Internet or by installing through a recording medium such as an optical disk, magnetic disk, and memory card. Other various types of recording media may be widely used.

Figure 3:
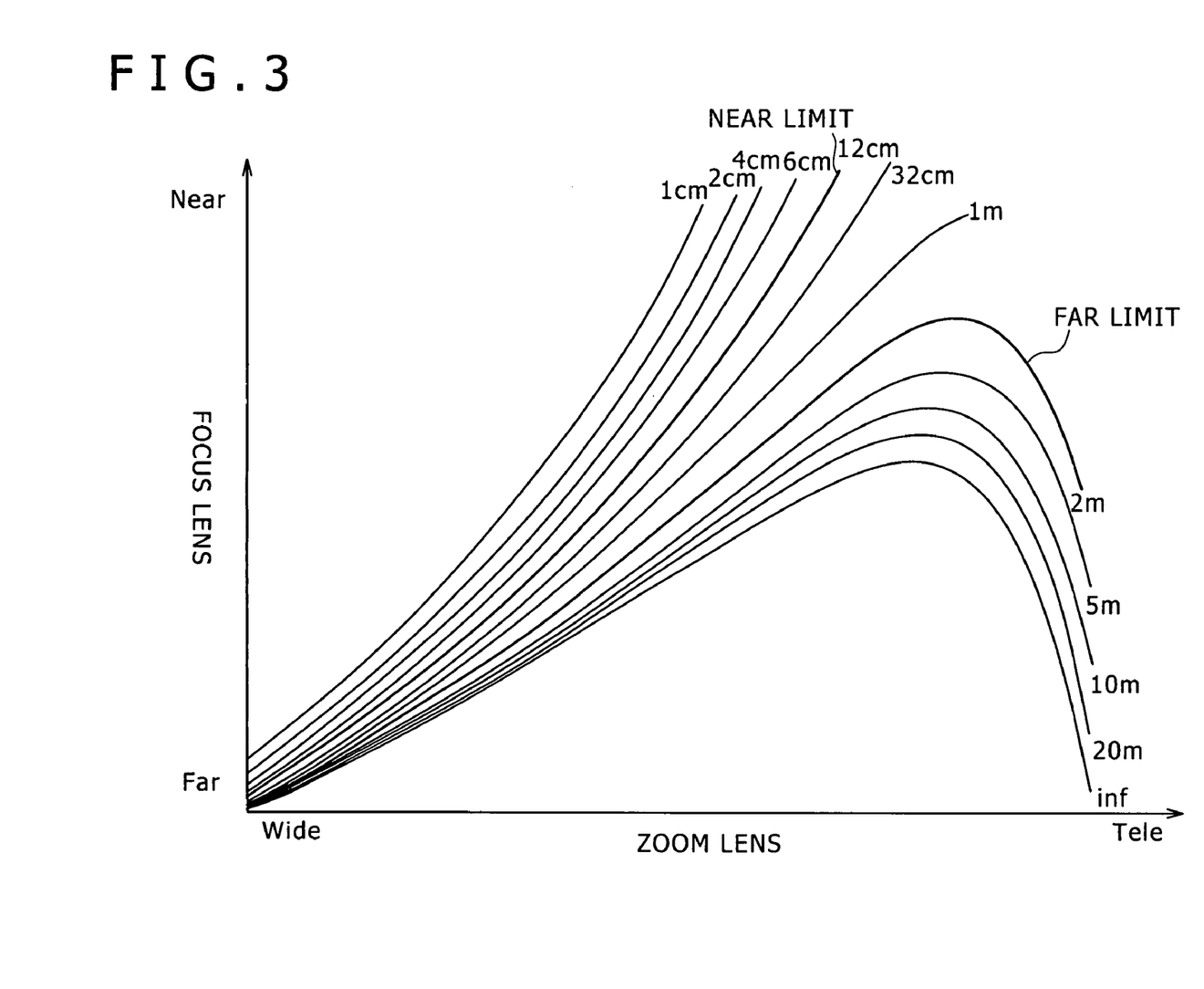
FIG. 3 is a graph showing the characteristics of cam curves.

The cam curve is defined as a characteristic curve indicating a positional relation between the zoom lens 2A and the focus lens 2B under the binding condition that focusing continues to be given at a given subject distance. The cam curve is referred to also as a focus curve. An inner focus type lens has such a characteristic that the cam curve changes according to the subject distance. In the imaging device 1, the zoom lens 2A and the focus lens 2B are moved in concert with each other according to this cam curve, thereby allowing zoom-in and zoom-out functions in a focusing condition for a desired subject distance. Thus, zoom tracking can be effected.

The cam curve data is stored in the memory 10 for each of various predetermined subject distances. In the example shown in FIG. 3, the cam curve data for twelve cam curves respectively corresponding to twelve subject distances of 1 cm to infinity is stored in the memory 10. The cam curve data is provided as discrete data obtained by sampling a movable range of the zoom lens 2A at a predetermined pitch and recording the position of the focus lens 2B relative to the position of the zoom lens 2A.

In the imaging device 1, a focused image ensuring range (which will be hereinafter referred to as "imaging range") is stored into the memory 10 according to the cam curve by setting upon installation or by setting for destination upon factory shipment. In the example shown in FIG. 3, the imaging range is set to a range of subject distances of 12 cm to 2 m, and the cam curve data specifying the cam curve corresponding to the subject distance of 12 cm and the cam curve corresponding to the subject distance of 2 m is stored into the memory 10 as data of the imaging range. In the following description, the cam curve corresponding to the larger one of the two subject distances defining the imaging range will be hereinafter referred to as "far limit curve", whereas the cam curve corresponding to the remaining smaller subject distance will be hereinafter referred to as "near limit curve".

When the imaging device 1 is powered on, the controller 7 performs the autofocus control by a hill-climbing method to start driving the lens 2 and outputting the video signal SV. More specifically, the controller 7 obtains the evaluation value S2 from the detecting circuit 9 for every frame and detects a difference in the evaluation value S2 between frames, then moving the focus lens 2B in a direction of increasing of the evaluation value S2 according to the difference between frames detected above.

The focus lens 2B is moved according to the autofocus control by the controller 7 as mentioned above, and the flow of processing shown in FIG. 1 is executed at given time intervals to thereby change the movement of the focus lens 2B according to the autofocus control into the movement of the focus lens 2B according to the cam curve.

Figure 1:
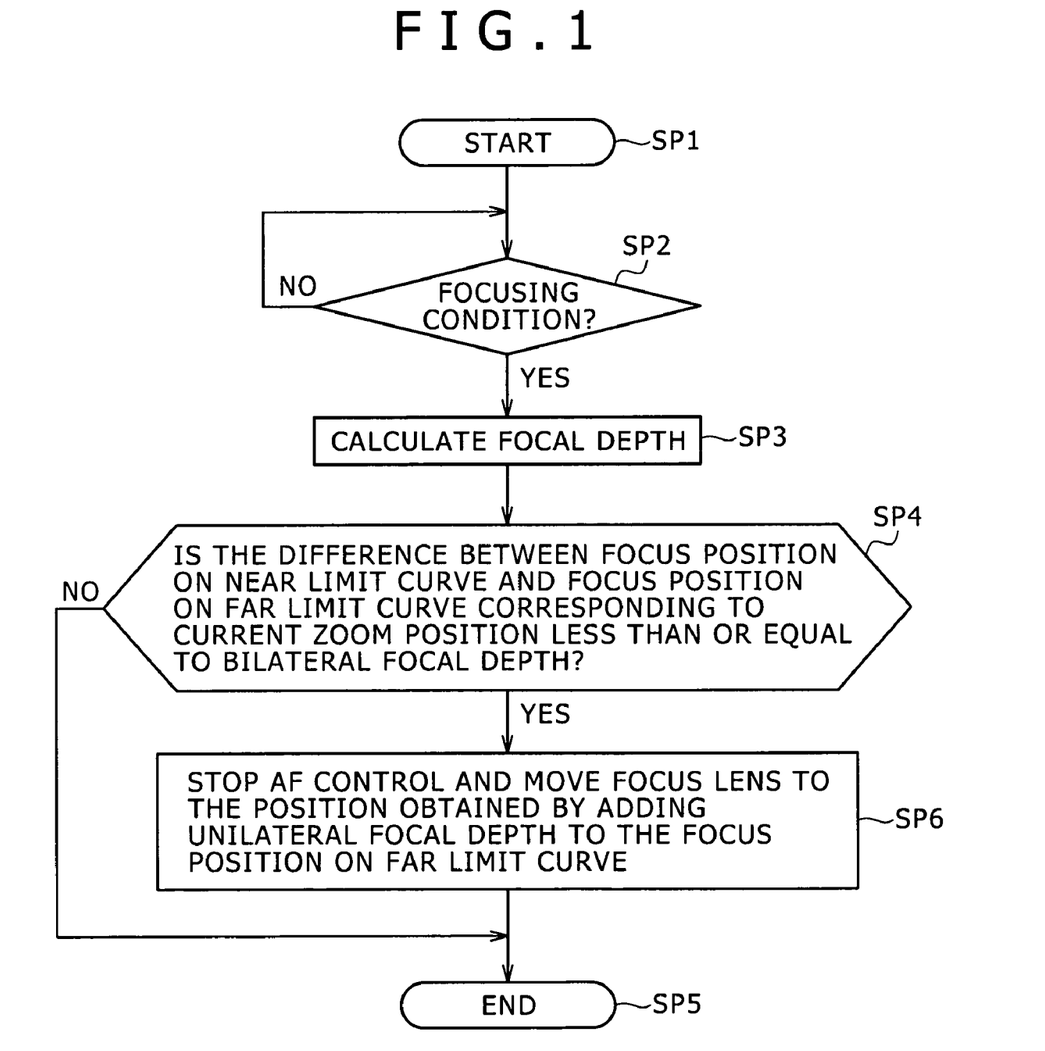
FIG. 1 is a flowchart showing the processing to be performed by a controller in an imaging device according to a preferred embodiment of the present invention.

Referring to FIG. 1, the controller 7 starts this flow of processing at step SP1, which is followed by step SP2 where it is determined whether or not a focusing condition is maintained. The focusing condition is detected by the controller 7 in the case that the zoom lens 2A is moved with the peak of the evaluation value residing in the range of this movement in the autofocus control by a hill-climbing method based on the evaluation value S2 obtained from the detecting circuit 9. In this manner, the determination of the focusing condition is made according to a change in the evaluation value S2 during the movement of the zoom lens 2A. However, other various determination methods may be widely applied within such a scope that practically sufficient characteristics can be ensured.

If the answer in step SP2 is negative, the controller 7 repeats the judgment of step SP2 to thereby wait for the formation of the focusing condition by the autofocus control. On the other hand, if the answer in step SP2 is affirmative, the program proceeds from step SP2 to step SP3 to calculate a focal depth.

Figure 4:
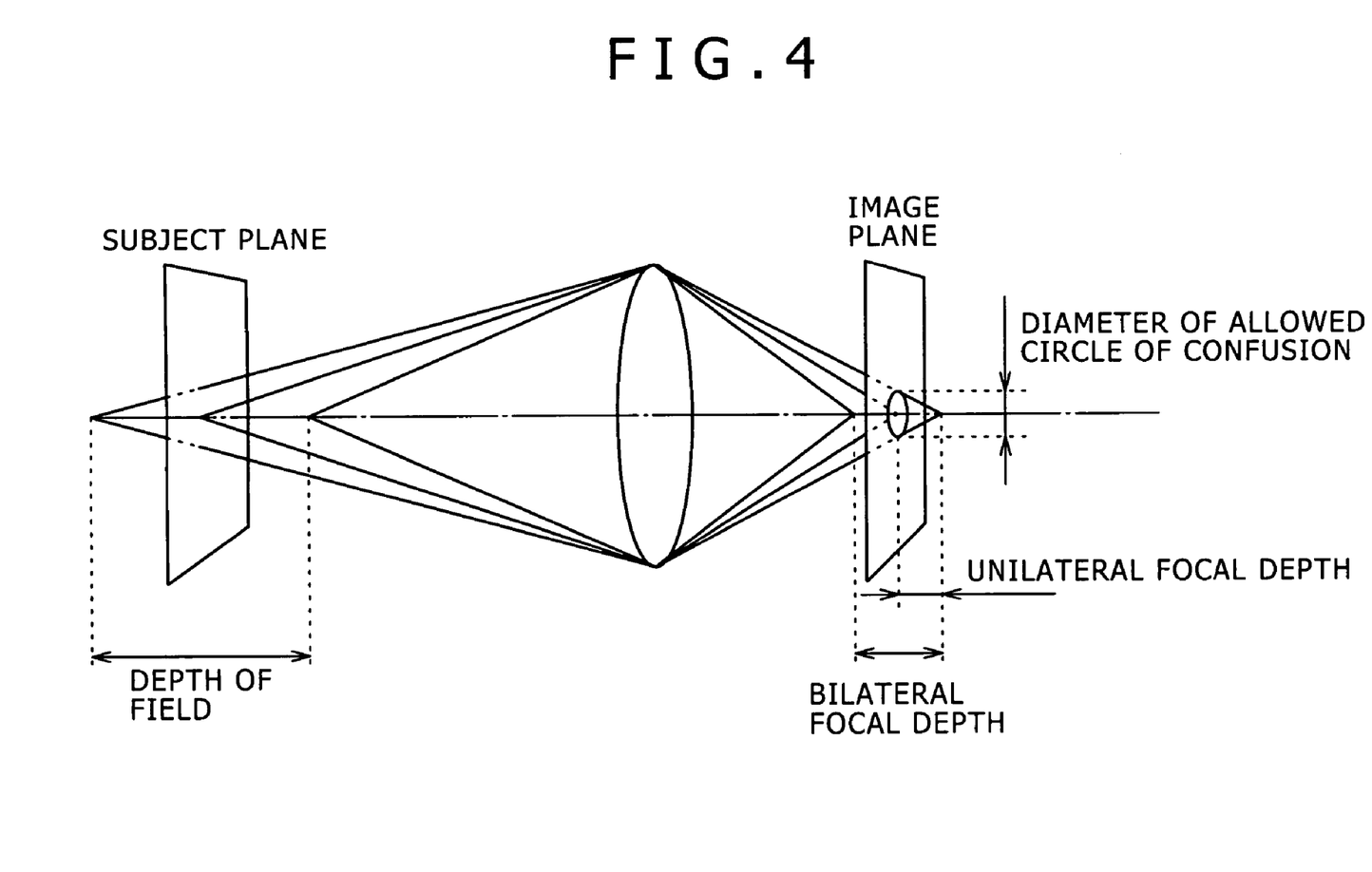
FIG. 4 is a schematic diagram for illustrating a focal depth.

In the case of forming an image by using a lens, only one accurate focusing position is present in an image plane as shown in FIG. 4. However, the amount of blurring is small in a predetermined range on both sides of the image plane where the focusing position is present, so that the image formed in this predetermined range can be regarded as being practically in the focusing condition. Such a range is represented by a focal depth $\delta$ with the focusing position being centered. This focal depth $\delta$ is expressed by (F-number)×(the diameter of an allowed circle of confusion, $\epsilon$) where the allowed circle of confusion represents an allowed maximum amount of blurring. The diameter of an allowed circle of confusion, $\epsilon$ is determined by the resolution of a processing system designed to output an image formed by a lens as an imaging result. More specifically, this diameter $\epsilon$ is uniquely determined by the pixel pitch of the image sensor 3.

The controller 7 calculates the F-number of the lens 2 according to the position of the zoom lens 2A detected by the position sensor 6A and the control amount of the stop, and then calculates the focal depth $\delta$ according to the F-number calculated above and the diameter $\epsilon$ preliminarily set by the pixel pitch of the image sensor 3.

Referring back to FIG. 1, the program proceeds to step SP4 to determine whether or not the range by the focal depth $\delta$ calculated above covers the imaging range. More specifically, the positions of the focus lens 2B corresponding to the current position of the zoom lens 2A on the far limit curve and on the near limit curve are detected, and it is determined whether or not the difference between the positions of the focus lens 2B is less than or equal to the focal depth $\delta$.

Figure 5:
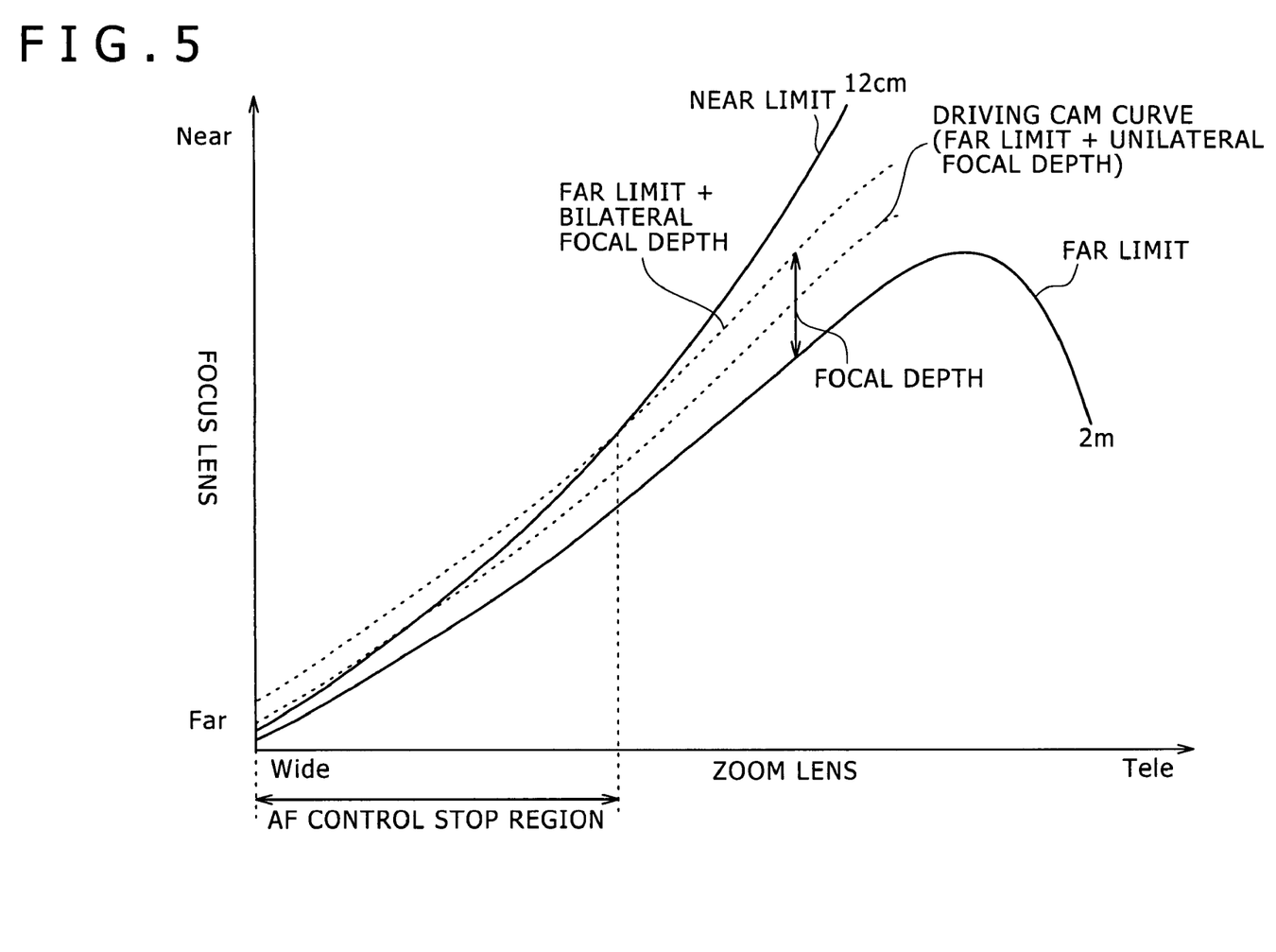
FIG. 5 is a graph for illustrating the switching between autofocus control and focus control by a cam curve.

In an inner focus type lens, the space between the cam curves is increased by a zoom-in operation as shown in FIG. 5, and the movable distance of the focus lens 2B for focusing is increased. In the case that the magnification in the zoom-in operation is greater than or equal to a given value, the answer in step SP4 becomes negative. In this case, the program proceeds to step SP5 to end this processing, then continuing to drive the lens 2 according to the autofocus control by a hill-climbing method.

On the other hand, if the answer in step SP4 is affirmative, the program proceeds from step SP4 to step SP6. In step SP6, the sampled points on the far limit curve are displaced toward the near limit curve by the amount corresponding to the unilateral focal depth (=½ of the focal depth $\delta$) by using the cam curve data stored in the memory 10, thus calculating position data. Then, the position data calculated above is subjected to interpolation processing, thereby obtaining a driving cam curve.

Further, the autofocus control is stopped to switch the whole operation so that the focus lens 2B is driven according to the driving cam curve obtained above. Accordingly, the controller 7 switches the whole operation so that the focus lens 2B is driven along the far limit curve so as to ensure the focal depth. Thereafter, the program proceeds to step SP5 to end this processing.

Thus, the autofocus control by a hill-climbing method is stopped in a given range with lower magnifications, and the focus control by the cam curve is performed instead. Accordingly, as compared with the case that the autofocus control is always performed, the load on a focus adjusting mechanism can be reduced to thereby improve the reliability.

In the case that the controller 7 switches the whole operation so as to perform the focus control by the cam curve as mentioned above, the flow of processing shown in FIG. 6 is repeatedly executed at given time intervals in place of the flow of processing shown in FIG. 1, thereby stopping the focus control by the cam curve as required to restart the autofocus control.

Figure 6:
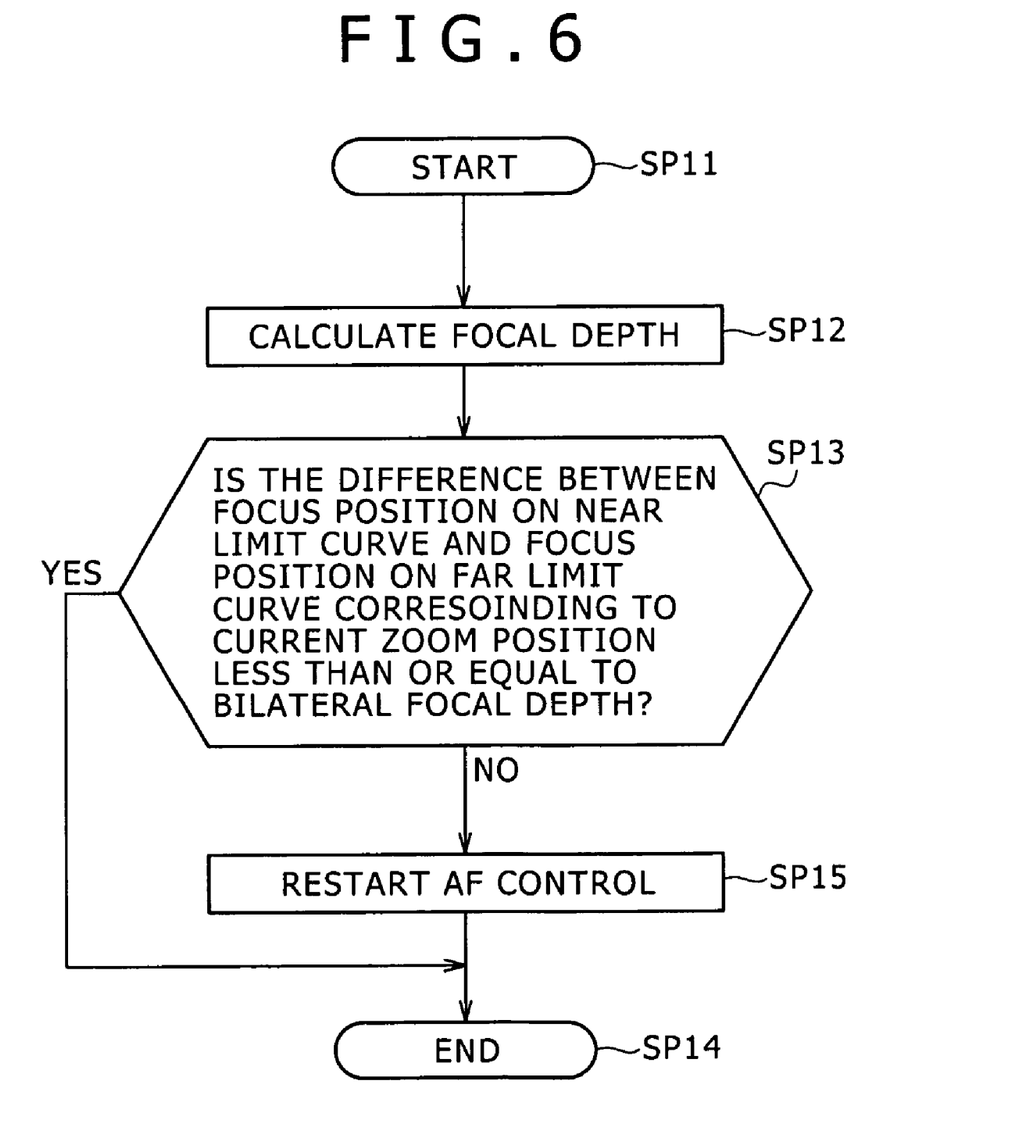
FIG. 6 is a flowchart showing the processing to be continued from the processing shown in FIG. 1.

Referring to FIG. 6, the controller 7 starts this flow of processing at step SP11, which is followed by step SP12 where a focal depth δ is calculated as in step SP3. Thereafter, the program proceeds to step SP13 to determine whether or not the range by the focal depth δ calculated above covers the imaging range as in step SP4.

If the answer in step SP13 is affirmative, the program proceeds to step SP14 to end this processing, then continuing to drive the focus lens 2B according to the focus control by the cam curve.

On the other hand, if the answer in step SP13 is negative, the program proceeds from step SP13 to step SP15 to stop the focus control by the cam curve and to restart the autofocus control. Thereafter, the program proceeds to step SP14 to end this processing.

In operation, an optical image formed by the inner focus type lens 2 in the imaging device 1 (see FIG. 2) is subjected to photoelectric conversion by the image sensor 3, thereby obtaining an imaging result by the image signal S1. The image signal S1 is then processed by the signal processing circuit 8 to generate the video signal SV. The video signal SV is then sent to a remote site, thereby allowing the monitoring of a desired subject at the remote site. Further, the controller 7 receives the remote control signal SC from the remote control device provided at the remote site to move the zoom lens 2A of the lens 2 according to the remote control signal SC, thereby allowing the control of the magnification of the lens 2 at the remote site and the transmission of another imaging result to the remote site.

In this series of processing, the video signal SV output from the signal processing circuit 8 is processed by the detecting circuit 9 to generate the evaluation value S2 indicative of the degree of focusing. This evaluation value S2 is input into the controller 7. In the controller 7, the focus lens 2B of the lens 2 is moved according to the autofocus control by a hill-climbing method so that the evaluation value S2 increases. By applying the inner focus type lens 2 to the imaging device 1, the imaging device 1 can be reduced in size as a whole. Further, zoom-in and zoom-out operations can be performed as maintaining a proper positional relation between the zoom lens 2A and the focus lens 2B.

In the autofocus control by a hill-climbing method, the focus lens 2B is always moved. Accordingly, in such a monitoring device always performing the autofocus control, the load on the focus adjusting mechanism in relation to the movement of the focus lens 2B becomes remarkable, causing a reduction in reliability of the focus adjusting mechanism.

To cope with this problem, the imaging device 1 according to the present invention is designed to perform the processing of FIG. 1. That is, when the focusing condition of the lens 2 is formed by the autofocus control, the current F-number of the lens 2 is calculated and the current focal depth δ is calculated by using this F-number (see FIGS. 1 and 4). In the range of the focal depth δ, no blurring is observed. In the processing according to the present invention, the focal depth δ and the imaging range preliminarily set are compared with each other, and it is determined whether or not this imaging range can be covered at the current positions of the zoom lens 2A and the focus lens 2B without the occurrence of blurring.

If the focal depth δ is less than the imaging range, the imaging range cannot be covered at the current positions of the zoom lens 2A and the focus lens 2B without the occurrence of blurring. Therefore, the autofocus control using the evaluation value is continued.

On the other hand, if the focal depth δ is greater than the imaging range, the imaging range can be covered at the current positions of the zoom lens 2A and the focus lens 2B without the occurrence of blurring. In this case, the autofocus control using the evaluation value is stopped and the focus control by the cam curve is performed to move the focus lens 2B. Further, when the focal depth δ becomes less than the imaging range during the focus control by the cam curve, the focus control by the cam curve is stopped to restart the autofocus control (see FIG. 6).

According to this processing, the time period for the autofocus control can be shortened by an amount corresponding to the focus control by the cam curve. Accordingly, the load on the focus adjusting mechanism can be correspondingly reduced to thereby improve the reliability of the focus adjusting mechanism. Further, the power consumption can also be reduced.

In the focus control by the cam curve, the focal depth is greater than the imaging range, so that no blurring occurs in the imaging range. Accordingly, blurring can be prevented in the required imaging range to effect the focus control sufficiently in a practical use.

In the imaging device 1 according to the present invention, this imaging range is defined by the far limit cam curve and the near limit cam curve, and the driving cam curve is produced by displacing the far limit cam curve toward the near limit cam curve by the unilateral focal depth. Then, the focus lens 2B is moved in concert with the movement of the zoom lens 2A according to this driving cam curve. Accordingly, the focus control by the cam curve according to the present invention is performed so that the focus lens 2B is moved on the basis of the far limit cam curve. As a result, in the case that the cam curve corresponding to the infinite subject distance is assigned to the far limit cam curve, the focus control can be performed so as not to ensure a focal depth at infinity, so that the focusing condition can be obtained in a wider range and a high-quality imaging result can therefore be output.

With the above configuration, the focal depth according to the position of the zoom lens and the imaging range at this position of the zoom lens are compared with each other, and according to the result of this comparison the autofocus control using the evaluation value and the focus control by the cam curve are switched to each other. Accordingly, in an imaging device using an inner focus type lens, the reliability of a focus adjusting mechanism can be greatly improved over the related art.

Further, by performing the focus control by the cam curve on the basis of the far limit cam curve specifying the imaging range, the focusing condition can be obtained in a wide range to thereby output a high-quality imaging result.

In the above preferred embodiment, the cam curve data corresponding to the twelve cam curves is stored in the memory. This configuration is merely illustrative, and the present invention is not limited thereto. For example, the cam curve data corresponding to only the two cam curves defining the imaging range may be stored in the memory. In this case, the capacity of the memory can be reduced.

In the above preferred embodiment, the autofocus control and the focus control by the cam curve are simply switched to each other. As a modification, when the focusing condition is obtained in the autofocus control, the autofocus control may be stopped. In this case, the load on the focus adjusting mechanism can be further reduced to thereby further improve the reliability and also to further reduce the power consumption.

Further, while the autofocus control and the focus control by the cam curve are switched to each other in the above preferred embodiment, the present invention is not limited to such a switching operation mode, but another operation mode for executing only the autofocus control may be added and these operation modes may be switched to each other by the remote control signal. In this case, an imaging result without blurring can be obtained even outside the imaging range in a zoom-out condition.

While the imaging range is preliminarily set in the above preferred embodiment, the imaging range may be varied by remote control.

While the driving cam curve is produced on the basis of the far limit cam curve to move the focus lens in the above preferred embodiment, the driving cam curve may be produced on the basis of the near limit cam curve as required. As another modification, the driving cam curve may be produced by averaging the far limit cam curve and the near limit cam curve. Further, in the case that blurring can be sufficiently prevented in a practical use, the focus lens may be moved according to any one of the cam curves included in the imaging range.

While the present invention is applied to an imaging device constituting a monitoring device in the above preferred embodiment, the present invention is widely applicable to various imaging devices.

Further, the present invention is applicable to a control method for such imaging devices, a program for performing the control method, and a recording medium recording the program.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An imaging device comprising:
   a lens including a zoom lens and a focus lens;
   an image sensor for outputting an imaging result of an optical image formed by said lens;
   signal processing means for processing said imaging result to output a video signal;
   detecting means for processing said video signal to output an evaluation value indicative of the degree of focusing;
   a memory for storing data of an imaging range where a focused image is ensured, by using a cam curve of said lens; and
   control means for moving said focus lens in concert with said zoom lens;
   wherein when a focal depth detected according to a current position of said zoom lens is less than said imaging range at said current position of said zoom lens, said control means performs autofocus control using said evaluation value to move said focus lens; and
   when said focal depth is greater than said imaging range at said current position of said zoom lens, said control means performs focus control by said cam curve to move said focus lens.

2. An imaging device according to claim 1, wherein the movement of said focus lens according to said cam curve is based on a far limit cam curve specifying said imaging range.

3. A control method for an imaging device comprising a lens including a zoom lens and a focus lens; an image sensor for outputting an imaging result of an optical image formed by said lens; signal processing means for processing said imaging result to output a video signal; a memory for storing data of an imaging range where a focused image is ensured, by using a cam curve of said lens; and control means for moving said focus lens in concert with said zoom lens;
   said control method comprising the steps of:
   calculating a focal depth according to a current position of said zoom lens;
   comparing said focal depth calculated by said calculating step and said imaging range at said current position of said zoom lens;
   performing autofocus control using an evaluation value indicative of the degree of focusing of said imaging result to move said focus lens when said focal depth is less than said imaging range according to the result of comparison by said comparing step; and
   performing focus control by said cam curve to move said focus lens when said focal depth is greater than said imaging range according to the result of comparison by said comparing step.

4. A control program, embodied on a computer readable medium, for making control means provided in an imaging device execute predetermined processing;
   said imaging device comprising:
   a lens including a zoom lens and a focus lens;
   an image sensor for outputting an imaging result of an optical image formed by said lens;
   signal processing means for processing said imaging result to output a video signal;
   a memory for storing data of an imaging range where a focused image is ensured, by using a cam curve of said lens; and
   said control means for moving said focus lens in concert with said zoom lens;
   said predetermined processing comprising the steps of:
   calculating a focal depth according to a current position of said zoom lens;
   comparing said focal depth calculated by said calculating step and said imaging range at said current position of said zoom lens;
   performing autofocus control using an evaluation value indicative of the degree of focusing of said imaging result to move said focus lens when said focal depth is less than said imaging range according to the result of comparison by said comparing step; and
   performing focus control by said cam curve to move said focus lens when said focal depth is greater than said imaging range according to the result of comparison by said comparing step.

5. A recording medium recording a control program for making control means provided in an imaging device execute predetermined processing;
   said imaging device comprising:
   a lens including a zoom lens and a focus lens;
   an image sensor for outputting an imaging result of an optical image formed by said lens;
   signal processing means for processing said imaging result to output a video signal;
   a memory for storing data of an imaging range where a focused image is ensured, by using a cam curve of said lens; and
   said control means for moving said focus lens in concert with said zoom lens;
   said predetermined processing comprising the steps of:

calculating a focal depth according to a current position of said zoom lens;

comparing said focal depth calculated by said calculating step and said imaging range at said current position of said zoom lens;

performing autofocus control using an evaluation value indicative of the degree of focusing of said imaging result to move said focus lens when said focal depth is less than said imaging range according to the result of comparison by said comparing step; and performing focus control by said cam curve to move said focus lens when said focal depth is greater than said imaging range according to the result of comparison by said comparing step.

* * * * *